(12) United States Patent
Rajamony

(10) Patent No.: US 6,442,550 B1
(45) Date of Patent: Aug. 27, 2002

(54) SYSTEM AND METHOD IN A COLLABORATIVE DATA PROCESSING ENVIRONMENT FOR CUSTOMIZING THE QUALITY OF SERVICE ON A PER-CLIENT BASIS

(75) Inventor: Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,496

(22) Filed: Dec. 14, 1999

(51) Int. Cl.[7] .............................................. G06F 17/30
(52) U.S. Cl. ........................................ 707/10; 709/217
(58) Field of Search .......................... 707/10, 200, 513; 713/190, 154; 709/217; 705/1, 26; 370/352

(56) References Cited

U.S. PATENT DOCUMENTS 5,418,967 A * 5/1995 Simcoe et al. .............. 340/988
6,157,917 A * 12/2000 Barber ......................... 705/26
6,311,269 B2 * 10/2001 Luckenbaugh et al. ..... 713/154

OTHER PUBLICATIONS

Raju Pandey et al., "Supporting Quality of Service in HTTP Servers," pp. 2–11.
Jussara Almeida et al., "Providing Differentiated Levels of Service in Web Content Hosting".

* cited by examiner

*Primary Examiner*—Diane D. Mizrahi
(74) *Attorney, Agent, or Firm*—Casimer K. Salys; Bracewell & Patterson, L.L.P.

(57) ABSTRACT

A server within a collaborative data processing environment transmits a priority value to a first client in response to a first request from the first client. A second request from the first client, which includes that priority value, and a third request from a second client are then received by the server. Thereafter, the server provides the second request with preferential treatment, relative to the third request, based on the priority value of the second request. In an illustrative embodiment, the priority value is transmitted to the first client within a Hypertext Transfer Protocol (HTTP) cookie.

9 Claims, 6 Drawing Sheets

SYSTEM AND METHOD IN A COLLABORATIVE DATA PROCESSING ENVIRONMENT FOR CUSTOMIZING THE QUALITY OF SERVICE ON A PER-CLIENT BASIS

BACKGROUND OF THE INVENTION

1. Technical Field

The present invention relates in general to data processing and in particular to collaborative data processing environments. Still more particularly, the present invention relates to systems and methods for customizing the quality of service (hereinafter "QoS") provided to clients within a collaborative data processing environment.

2. Description of the Related Art

Collaborative data processing environments typically utilize a client/server architecture, in which one or more data processing systems operate as servers, providing resources to one or more other data processing systems operating as clients. One of the major advantages provided by this network architecture is that it allows clients that lack certain resources to obtain those resources from the servers. The Internet, for instance, is a client/server network, having a large number of Web servers that provide resources such as Web pages to clients (i.e., data processing systems running client software) in response to requests from those clients.

Currently, businesses and other organizations commonly make information and/or services (such as retail sales) available to the public via Web servers. A Web server is a data processing system that is connected to a network such as the Internet and that provides information and services to other data processing systems upon request. A disadvantage associated with the client/server paradigm, however, is that a server can only provide services to a limited number of concurrent requests before the performance of the server suffers significant degradation.

A number of strategies have been proposed to address the problem of server overload, including strategies which recognize the fact that organizations frequently do not maintain their own Web servers but instead purchase or receive free hosting services from a Web content hosting provider (hereinafter a "host"). For instance, one such strategy replaces the server's conventional sequential request dispatcher (which causes requests to be processed in order of receipt) with a dispatcher that prioritizes requests based on whether the requests involve access to resources of a paying customer of the host or a customer that is receiving complimentary hosting services. Server-centric strategies such as this (i.e., strategies that prioritize based on characteristics of the resource being served) certainly provide benefits, in that they allow hosts to customize the QoS provided on a per-resource basis. However, such strategies do not enable servers to customize the QoS provided on a per-client basis (i.e., based on characteristics of the client making the request).

The present invention recognizes that organizations often consider requests from some clients to be more important than requests from others, even when those requests involve the same resource. For example, if an airline that sells tickets over the Internet was to receive two requests for rate information, one from a person with no prior involvement with the company and one from a customer with a history of purchasing first-class tickets, the airline might well prefer to process the latter request before the former.

However, Web servers and clients commonly utilize the Hypertext Transfer Protocol (HTTP), and that protocol is non-persistent (or stateless). That is, HTTP does not inherently provide a context that identifies consecutive requests from a particular client as related. Instead, Web servers open a new connection for each request, even if the requests pertain to items of content (such as text and images) to be displayed within a single Web page.

Another protocol utilized by some Web servers and clients, persistent HTTP (P-HTTP), maintains enough state information to allow clients and servers to utilize a single connection for a number of related requests (such as all of the requests pertaining to a single Web page). However, P-HTTP allows servers and clients to close connections unilaterally, in which case a number of related requests might require multiple connections, even though P-HTTP is being utilized. Furthermore, as with HTTP, P-HTTP does not maintain state across separate sessions of interaction. As utilized herein, "session of interaction" means a set of requests from a client involving a set of related server resources (such as Web pages from a particular Web site) and the corresponding responses. The session starts when the client transmits an initial request involving the related resources. The session ends, for example, when the client begins communicating with a different Web site or when the client terminates the Web browser. As suggested above, even under P-HTTP, one session may involve multiple connections.

Since communication protocols such as HTTP and P-HTTP do not preserve state information from one session for use in the next, additional difficulty is associated with providing client-centric priority in networks which utilize such protocols, in comparison to networks with stateful protocols (e.g., protocols that keep state information identifying particular clients even after requests from those clients have been serviced). However, HTTP does provide servers with the option of storing data records ("cookies") on clients, such that the stored data will be returned to the servers automatically within subsequent requests from those clients. The Microsoft Press Computer Dictionary, Third Edition, defines "cookie" as follows:

> a block of data that a Web server stores on a client system. When a user returns to the same Web site, the browser sends a copy of the cookie back to the server. Cookies are used to identify users, to instruct the server to send a customized version of the requested Web page, to submit account information for the user, and for other administrative purposes (def. 2).

Accordingly, by utilizing cookies, a Web server can create a context within which the server can recognize a request from a client as related to previous requests from the same client.

As recognized by the definition quoted above, cookies are currently utilized to influence the content provided to a client by a Web server. By contrast, the present invention utilizes context-creating facilities, such as cookies, to influence the quality of services provided to a client, such that requests from favored clients are given preferential treatment, relative to requests from less important or unknown clients.

SUMMARY OF THE INVENTION

To address the shortcomings of conventional techniques for processing network requests, the present invention provides a method, system, and program product in which a priority value is transmitted to a first client in response to a first request from the first client. A second request from the first client which includes that priority value and a third request from a second client are then received by the server.

Thereafter, the server provides the second request with preferential treatment, relative to the third request, based on the priority value of the second request. In a preferred embodiment, the priority value is transmitted to the first client within an HTTP cookie.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
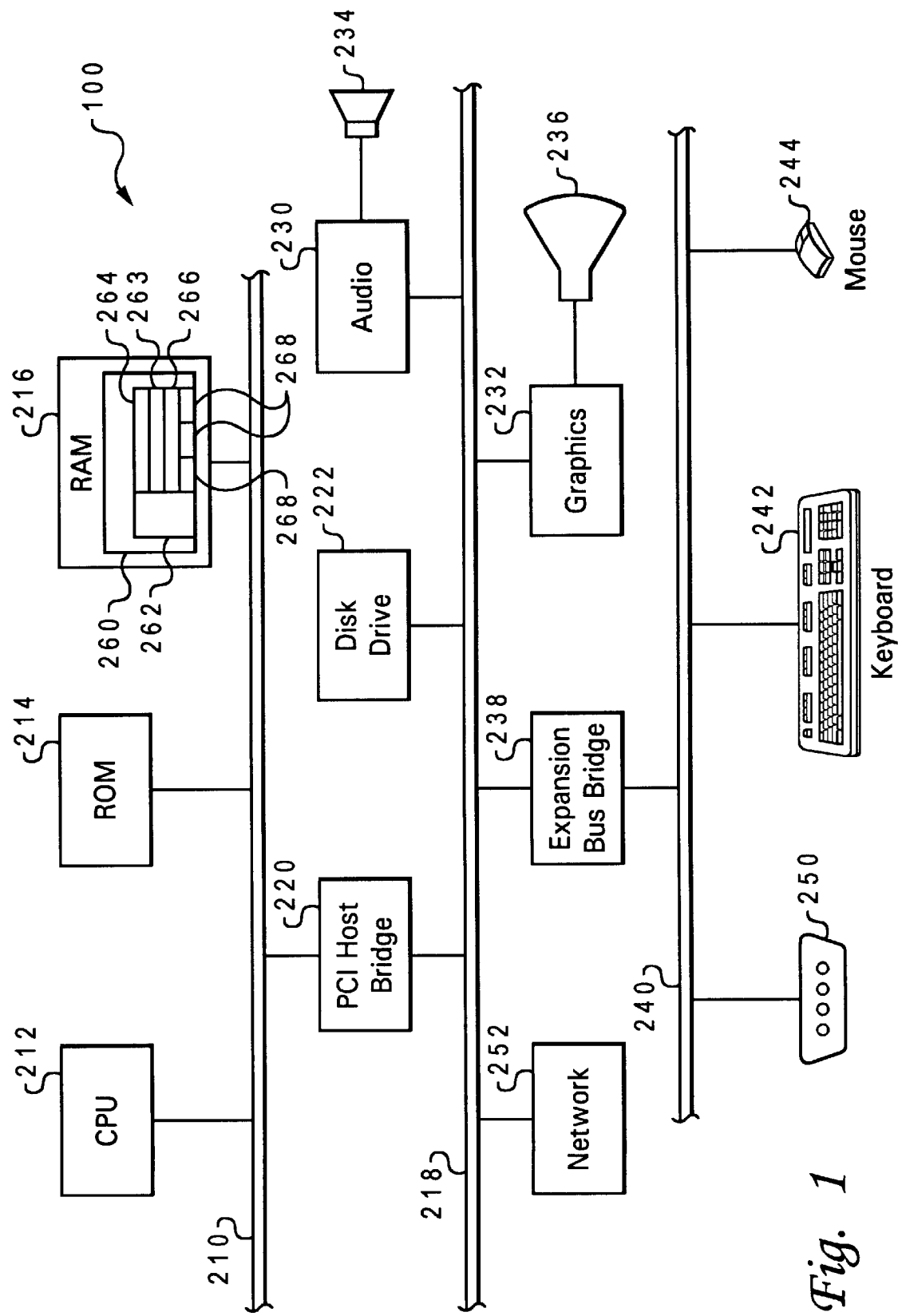
FIG. 1 depicts a block diagram of an illustrative embodiment of a server with facilities for customizing the QoS provided on a per-client basis according to the present invention.

With reference now to the figures, and in particular with reference to FIG. 1, there is depicted a block diagram of a server 100 with facilities, according to the present invention, for customizing the quality of service provided on a per-client basis. As shown, server 100 includes a system bus 210 that is connected to at least one central processing unit (CPU) 212 and to memory, including read only memory (ROM) 214 and random access memory (RAM) 216. System bus 210 is coupled to a PCI local bus 218 through a PCI host bridge 220. PCI local bus 218 is connected to additional nonvolatile data storage devices, such as one or more disk drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keyboard 242 and a mouse 244 for receiving operator input.

Also included in server 100 are data ports for communicating with external equipment, such as other data processing systems. Those data ports include, without limitation, a serial port 250 attached to ISA bus 240 for linking server 100 to remote data processing systems via data communications equipment, such as a modem (not illustrated) or a channel service unit/data service unit (CSU/DSU) (not illustrated). Those data ports may also include a network adapter 252 attached to PCI bus 218 for linking server 100 to other stations of a local area network (LAN) (not illustrated).

Server 100 also contains programs and data that are stored on the data storage devices, such as disk drive 222. The programs are retrieved from data storage, loaded into RAM 216, and executed by CPU 212 to provide various functions. In particular, in the illustrative embodiment server 100 is a Web server. Accordingly, the programs of server 100 includes a server program 260 that manages the exchange of information between server 100 and other data processing systems. The data includes a Web site (hereinafter "the Acme Web site") having one or more Web pages that allow people to view ticket prices and purchase Acme Airline tickets via the Internet.

As described in greater detail below, server program 260 includes an input facility 262 for receiving messages (such as requests for resources) from remote data processing systems, a queue 263 for storing received requests, and a priority manager 264 for prioritizing those requests on a per-client basis. In addition, server program 260 includes a dispatcher 266, which dispatches the requests for servicing according to their respective priorities, and one or more threads 268, which service dispatched requests and return responses to the remote data processing systems.

Figure 2:
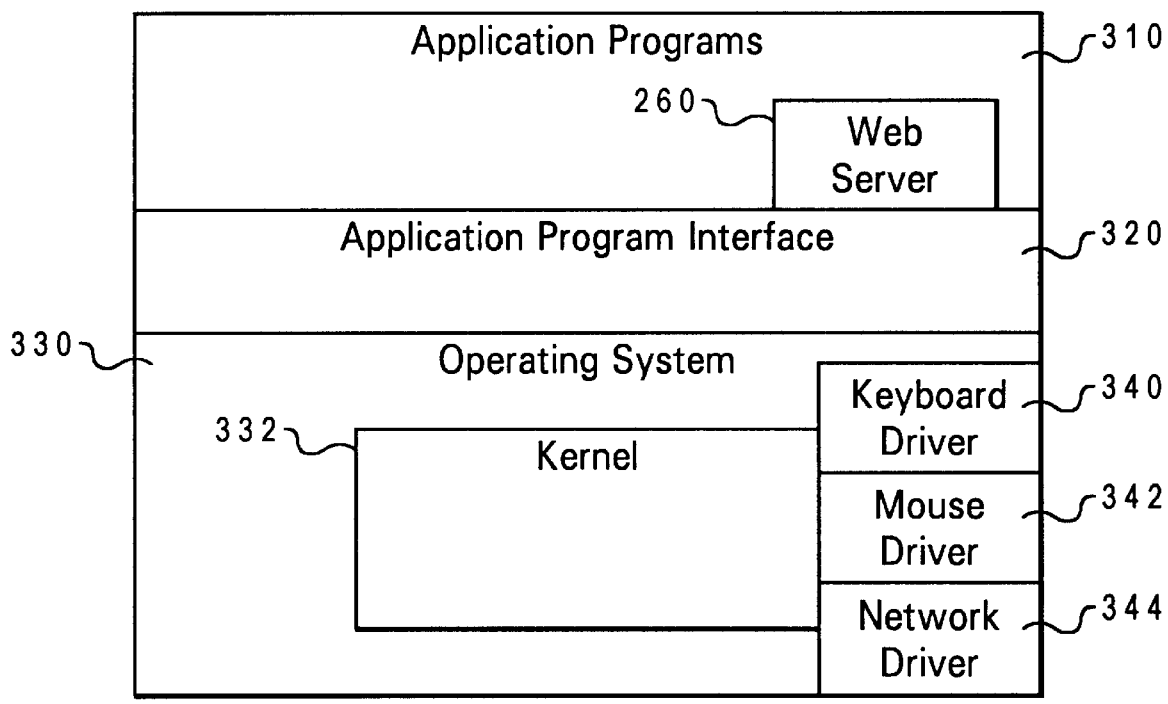
FIG. 2 is a layer diagram of software in the server of FIG. 1.

Referring now to FIG. 2, there is depicted a layer diagram of the software of server 100. At the highest level of the diagram are the application programs 310, including server program 260. At the intermediate level is an application program interface (API) 320, through which application programs 310 request services from the operating system 330. Operating system 330, which occupies the lowest level of the diagram, manages the operations of server 100 by performing duties such as resource allocation, task management, and error detection. Operating system 330 also provides tools for managing communications between server 100 and remote data processing systems (such as clients 110a and 110b of FIG. 3). Included in operating system 330 is a kernel 332 that manages the memory, files, and peripheral devices of server 100. The lowest level also includes device drivers, such as a keyboard driver 340, a mouse driver 342, and a network driver 344, which kernel 332 utilizes to manage input from and output to peripheral devices and communication ports.

Figure 3:
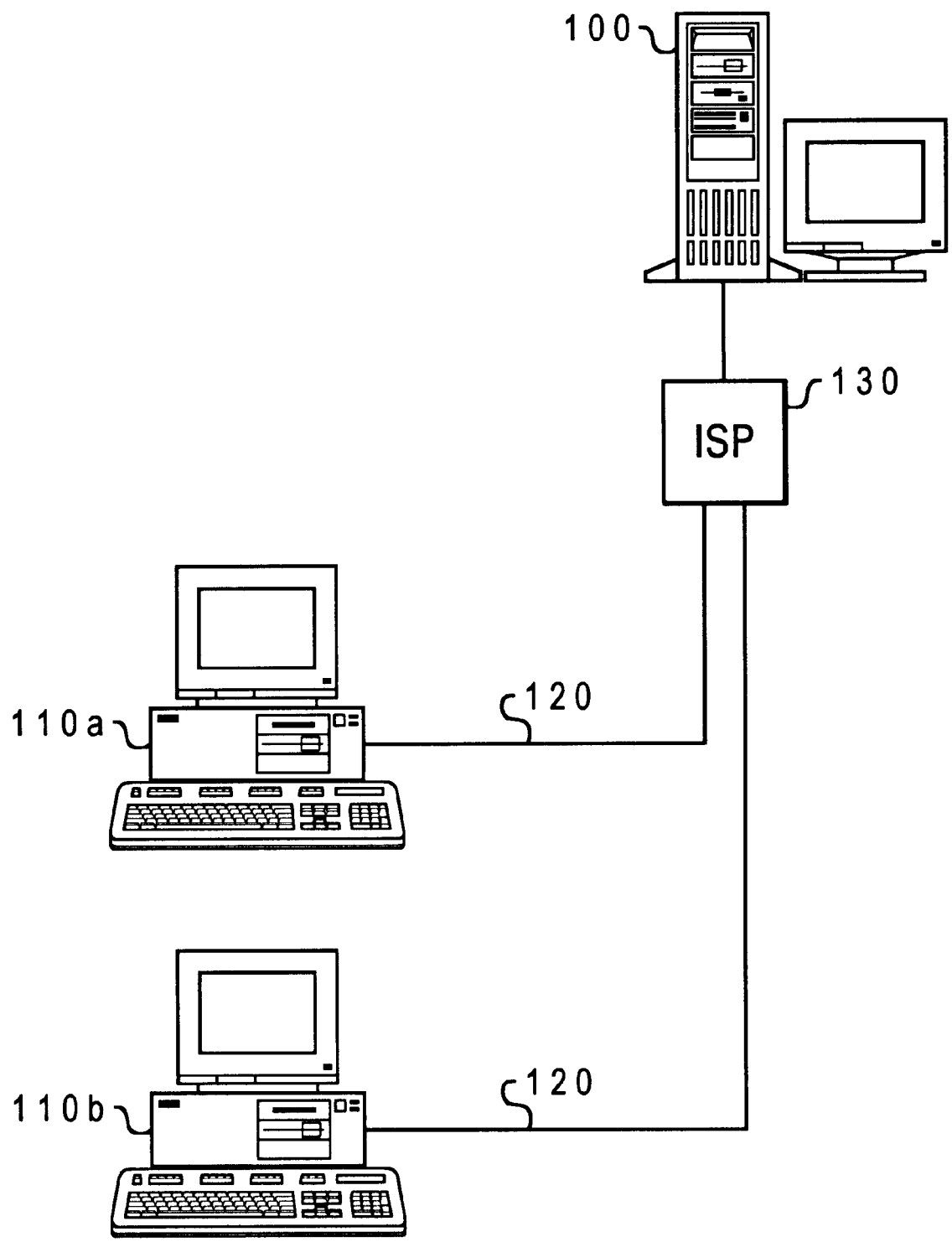
FIG. 3 illustrates an exemplary collaborative data processing environment according to the present invention.

With reference to FIG. 3, there is depicted an exemplary collaborative data processing environment or network according to the present invention that includes server 100. The network of the illustrative embodiment also includes two clients 110a and 110b, which are connected to server 100 via communications media 120 (such as twisted-pair cables, coaxial cables, telephone lines, microwave links, and/or radio links) and an intermediate data processing system, such as an Internet service provider ("ISP") 130.

In the illustrative embodiment, each of clients 110a and 110b includes a Web browser with facilities for accepting and storing cookies from, and returning cookies to, Web servers. Furthermore, client 110a contains a "priority cookie" from the Acme Web site, whereas client 110b does not. As utilized herein, a "priority cookie" is a data record which is (or is intended to be) stored in a client and which contains a name and/or a value that will be included in subsequent requests from that client and that will be recognizable to a server as indicating a priority for those subsequent requests.

In the illustrative embodiment, server program 260 utilizes priority cookies with priority values in the range from "1" through "8" (with "8" indicating the highest priority). The priority cookie in client 110a contains a priority value (e.g., the value "8") and was received (in accordance with the process described below with respect to steps 640 through 670 of FIG. 6) in response to the purchase of a ticket from the Acme Web site during a past session of interaction with that site.

Figure 4:
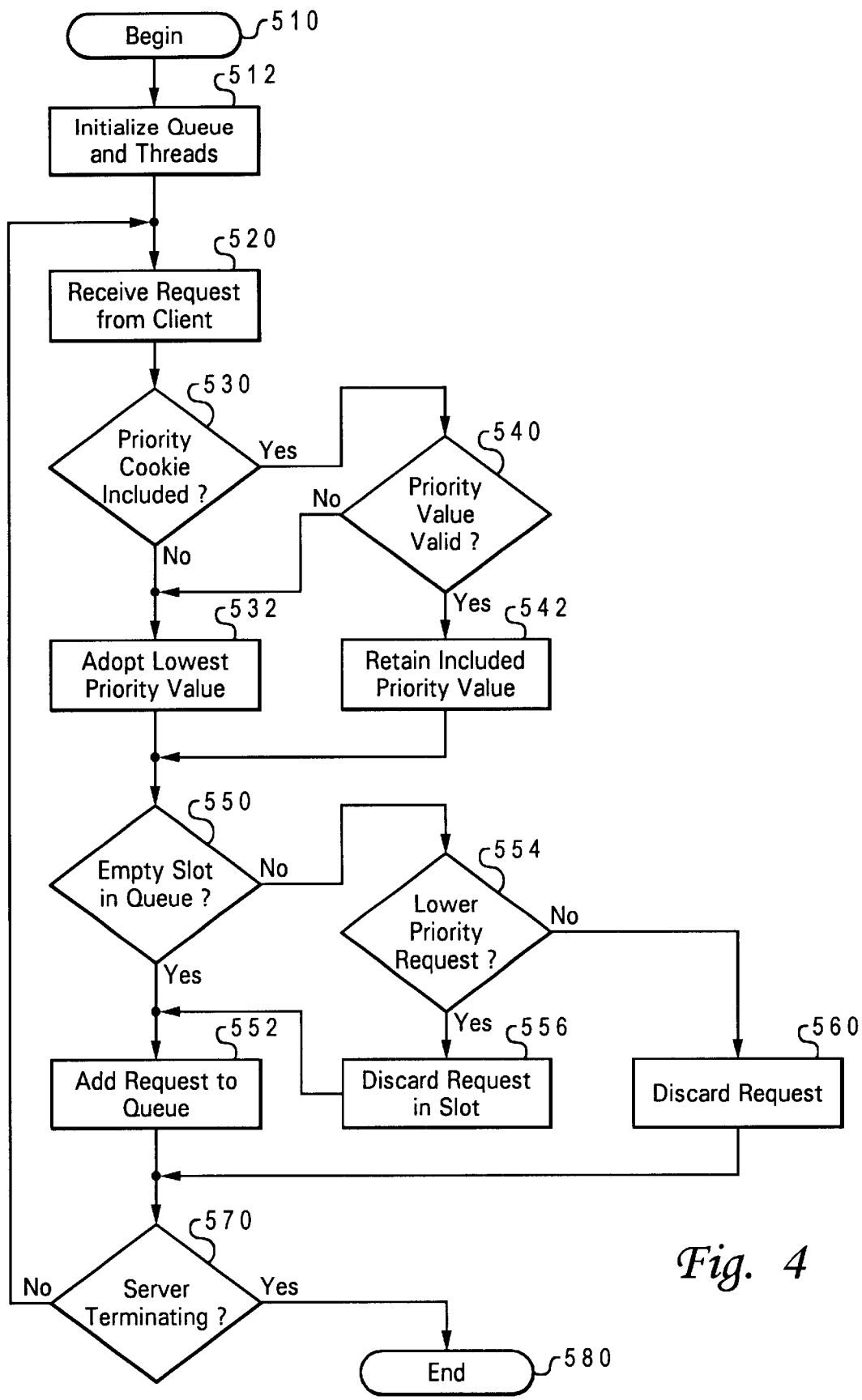
FIG. 4 depicts a logical flowchart of an exemplary process, in accordance with the present invention, for assigning priorities to client requests on a per-client basis.

Referring now to FIG. 4, there is depicted a flowchart of an exemplary process, in accordance with the present invention, for prioritizing client requests within server 100. That process begins at block 510 with server 100 executing server program 260, which prepares to receive client requests by initializing queue 263 and threads 268, as illustrated at block 512. The process then enters an input loop in which requests are received from clients, prioritized, and placed in queue 263 to await servicing. That input loop begins at block 520, which shows input facility 262 receiving a client request.

The process then passes to block 530, which illustrates priority manager 264 examining the request to determine whether it contains a priority cookie. If the request is from client 110b, since that client does not contain a priority cookie for server 100, neither will the request. Consequently, the process will proceed to block 532, which shows priority manager 264 assigning the lowest priority value (i.e., "1") to the request. However, if the request is from client 110a, the request will include a priority cookie, and the process will therefore proceed from block 530 to block 540. As shown at block 540, priority manager 264 will then examine the priority value of the priority cookie to determine whether that value is valid. If it is not, priority manager 264 assigns the lowest priority value to the request, as shown at block 532. Otherwise, the request retains the priority value from the priority cookie, as shown at block 542.

In the illustrative embodiment, server program 260 places all requests into queue 263, to be dispatched and serviced according to the processes described below with reference to FIGS. 5 and 6, respectively. Queue 263 is organized by priority and age, with higher priority requests being placed before (i.e., closer to the head of the queue than) lower priority requests. Among requests with the same priority, newer requests are placed after older ones.

When requests are placed into queue 263, they no longer contain priority cookies; however, each request is placed into queue 263 as part of a tuple (or data structure) which also contains that request's priority value. After determining which priority value should be associated with the subject request, server program 260 determines whether there is an empty slot in queue 263, as depicted at block 550. If so, server program 260 places the request and the priority value of that request into the empty slot and moves that slot before all lower priority request (if any) and after any older requests with the same priority (if any), as illustrated at block 552.

However, if there is no empty slot in queue 263, the process passes from block 550 to block 554, which shows server program 260 determining whether any slot contains a request with a lower priority, starting with the newest request at the lowest priority. If a slot with a lower priority is found, server program 260 reclaims that slot by discarding that slot's request, as shown at block 556. Server program 260 then utilizes the reclaimed slot to place the subject request and its priority value into queue 263 in an appropriate position, as depicted at block 552 and described above. If there are no slots with a lower priority than the subject request, however, server program 260 discards the subject request, as shown at block 560.

As illustrated at block 570, once the request has been either added to queue 263 or discarded, it is determined whether server program 260 is terminating (e.g., in response to instructions from a system administrator). If so, server program 260 performs various clean-up operations, such as terminating threads 268, and the process then ends, as shown at block 580. Otherwise, the process returns to block 520 to resume the input loop.

Figure 5:
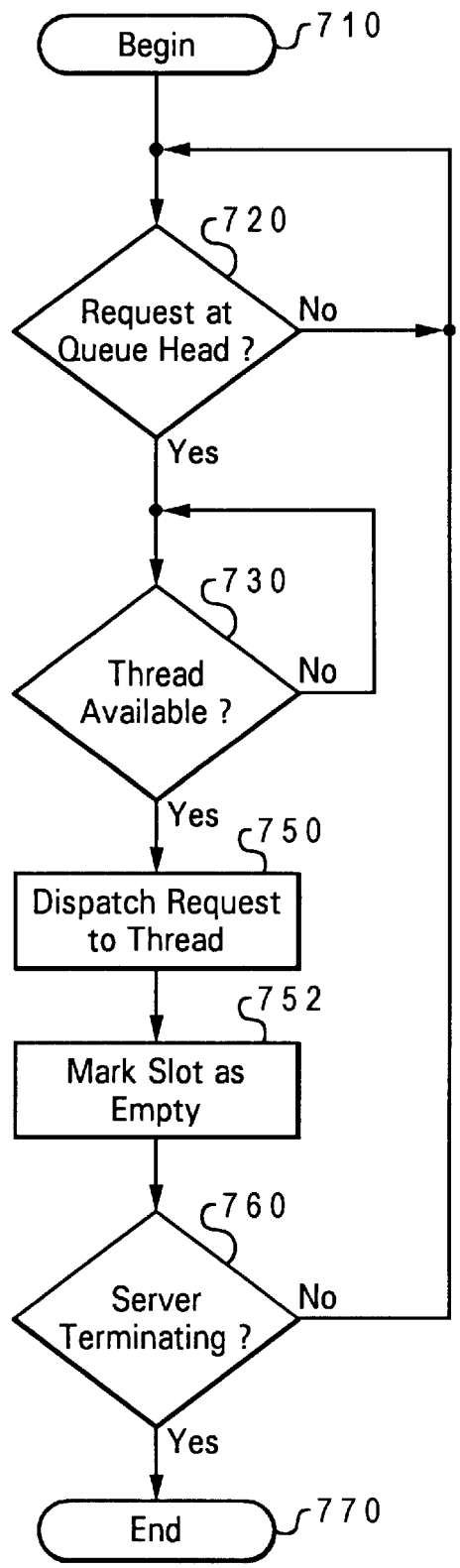
FIG. 5 illustrates a logical flowchart of an exemplary process for dispatching prioritized requests for servicing by service threads according to the present invention.

With reference to FIG. 5, there is depicted an illustrative process of dispatching prioritized requests. This exemplary process, which generally occurs substantially simultaneously with the process depicted in FIG. 4, begins at block 710 with server program 260 executing in server 100. The process then passes to block 720, which illustrates dispatcher 266 determining whether queue 263 contains any requests. If queue 263 is empty, dispatcher 266 repeats the determination depicted at block 720 to wait for a request to be placed into queue 263. Otherwise, the process passes to block 730, which shows dispatcher 266 determining whether any threads 268 are available.

If no threads 268 are available, dispatcher 266 repeats the determination depicted at block 730 to wait for a thread 268 to become available. Otherwise, the process passes to block 750, which depicts dispatcher 266 dispatching the request at the head of queue 263 to an available thread 268. If a thread 268 with an operating system priority that corresponds to the priority value of the request to be dispatched is available, dispatcher 266 selects that thread 268. Otherwise, the available thread 268 with the lowest operating system priority is selected. Also, when dispatching the request, dispatcher 266 preferably provides the priority value of the subject request, along with the request itself, as input to the selected thread 268. That thread 268 then services the dispatched request, as described below with reference to FIG. 6.

Preferably, for each CPU of server 100, server program 260 utilizes several processing threads 268, so that if an instruction in one thread 268 is blocked (e.g., waiting for I/O), the CPU can process instructions in the other thread 268. Furthermore, server program 260 preferably associates one or more threads 268 with each priority value and assigns an operating system priority to each thread 268 that corresponds to the priority value with which that thread 268 has been associated. For example, the thread (or threads) 268 associated with priority value "2" might have a higher operating system priority than the thread (or threads) 268 associated with priority value "1".

Once the request has been dispatched, dispatcher 266 marks that request's slot as empty and moves the slot to the tail of queue 263, as illustrated at block 752. Then, as depicted at block 760, it is determined whether server program 260 is terminating, in which case the process ends, as shown at block 770. Otherwise, the process returns to block 720 to begin processing the next request at the head of queue 263.

Figure 6:
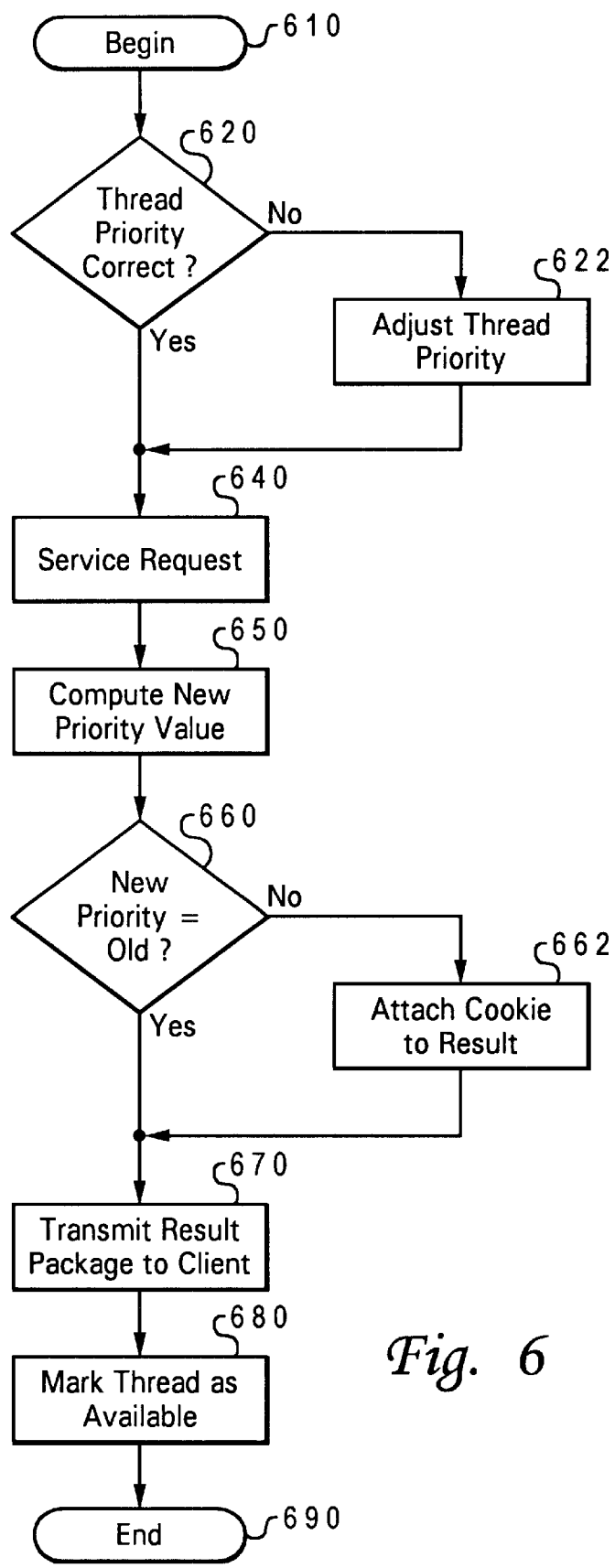
FIG. 6 depicts a logical flowchart of an exemplary process for servicing dispatched requests according to the present invention.

Referring now to FIG. 6, there is depicted an illustrative process for servicing dispatched requests according to the present invention. The process begins at block 610 with dispatcher 266 having dispatched a request to an available thread 268, as depicted at block 750 of FIG. 5. The process then proceeds to block 620, which illustrates thread 268 determining whether its operating system priority corresponds to the priority value of the subject request. If those priorities do not correspond, the process passes to block 622, which shows thread 268 adjusting its operating system priority to correspond to the priority value via a call to the operating system through the API.

Once the priorities are brought into correspondence (or determined to correspond), the process passes to block 640, which illustrates thread 268 servicing the request. Depending on the nature of the services requested, thread 268 may process the request either directly or indirectly through a service agent. If utilizing a service agent, thread 268 selects and configures the service agent according to the nature of the services requested, releases that service agent for execution, and then receives a result. When configuring a service agent, thread 268 propagates the priority through to that service agent. For example, if a request with a priority of "8" requires a call to a database, thread 268 causes the database call to be associated with a priority that the database engine will recognize as a high (or highest) priority, thus causing the database engine to give the subject request precedence over requests with lower priorities.

Once thread 268 obtains a result, either directly or from the service agent, thread 268 computes a new priority value for the client based on the nature of the processed request and/or its result, as illustrated in block 650. For example, requests may be categorized into interaction classes (such as browse-only, coach, and first-class categories for requests involving no purchase, a purchase of coach-class tickets, and a purchase of first-class tickets, respectively), and thread 268 may determine new priority values based on the interaction class of the processed request.

As depicted at block 660, thread 268 then determines whether the new priority value matches the original one. If so, thread 268 simply returns the result to the client, as shown in block 670. However, if the new priority value differs from the original one, thread 268 attaches to the result a priority cookie with the new priority value, as depicted in block 662, before returning that result to the client, as shown in block 670. For example, if the processed request was a request from client 110b to purchase a first-class ticket (in which case the request would not have included a priority value), server program 260 might return a response with a message confirming the ticket sale and with a priority cookie with a value of "8".

As illustrated in block 680, after thread 268 transmits the result to the client, thread 268 is marked as available. The process then ends, as shown at block 690.

As has been described, the present invention provides client-centric prioritization within a network utilizing both persistent and non-persistent communications protocols. Priorities are established by storing priority values on clients, such that subsequent requests from those clients include the stored priority values. While the invention has been particularly shown and described with reference to an illustrative embodiment, it will be understood by those skilled in the art that various changes in form and detail may be made therein without departing from the spirit and scope of the invention.

For example, the illustrative embodiment has been described in terms of particular queue and thread configurations, but alternative embodiments of the present invention could as well utilize different configurations, including multiple queues with each queue dedicated to one or more priority classes. Also, alternative embodiments could utilize different dispatching strategies, for example by pre-empting threads with lower-priority requests when higher priority requests are received, by utilizing multiple dispatchers, and/or by determining whether any higher-priority requests have been received after determining that a thread has become available but before dispatching a request to that thread for servicing. In addition, while illustrative processes of dispatching requests and servicing dispatched requests have been described, the present invention could utilize alternative processes in which, for example, the dispatcher and the threads are integrated, such that the threads themselves select the requests from the queue.

Also, although the server of the illustrative embodiment is depicted as a personal computer, the present invention could as well be implemented on other types of servers, including, without limitation, mini-computers and mainframe computers. In addition, certain operations of the present invention have been described as being performed by software, particularly by input facility 262, priority manager 264, dispatcher 266, and threads 268, each of which is depicted as a component of server program 260. However, those of ordinary skill in the art will appreciate that some or all of the described operations could be performed alternatively by components that are separate from server program 260, whether those components are implemented as software, hardware, firmware, or a combination of these.

It should also be understood that the present invention is not limited to Internet or HTTP/P-HTTP communications, but could as well benefit collaborative data processing environments utilizing other protocols. Likewise, although the illustrative embodiment utilizes HTTP cookies to maintain client priorities, alternative embodiments for other protocols might utilize similar, but not identical, mechanisms to maintain client priorities. Further, though the illustrative embodiment describes cookies that contain unencrypted security values (such as "8"), alternative embodiments of the present invention could encryt the priority value before storing it on the client.

Also, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method within a collaborative data processing environment for customizing the quality of service provided on a per-client basis, said method comprising:

transmitting a first priority value from a server to a first client in response to a first request from said first client;

receiving a second request from said first client and a third request from a second client, said second request including said priority value;

providing said second request with preferential treatment, relative to said third request, based on said priority value of said second request;

transmitting a second priority value to said second client in response to an earlier request from said second client received before said third request; and providing said second request with preferential treatment comprises providing said second request with preferential treatment based on said respective first and second priority values of said second and third requests.

2. A method within a collaborative data processing environment for customizing the quality of service provided on a per-client basis, said method comprising:

transmitting a first priority value from a server to a first client in response to a first request from said first client;

receiving a second request from said first client and a third request from a second client, said second request including said priority value; and providing said second request with preferential treatment, relative to said third request, based on said priority value of said second request by dispatching said second request to be serviced before dispatching said third request.

3. A method within a collaborative data processing environment for customizing the quality of service provided on a per-client basis, said method comprising:

transmitting a priority value from a server to a first client in response to a first request from said first client;

receiving a second request from said first client and a third request from a second client, said second request including said priority value; and providing said second request with preferential treatment, relative to said third request, based on said priority value of said second request with preferential treatment comprising propagating said priority value to a service agent for said second request.

4. A server with facilities for customizing the quality of service provided within a collaborative data processing environment on a per-client basis, said server comprising:

a processing thread that transmits a first priority value to a first client in response to a first request from said first client and transmits a second priority value to a second client in response to an earlier request from said second client received before a third request;

an input facility that receives a second request from said first client and a third request from a second client, said second request including said first priority value; and a dispatcher that causes said second request to be processed preferentially, relative to said third request, based on said respective first and second priority values of said second and third requests.

5. A server with facilities for customizing the quality of service provided within a collaborative data processing environment on a per-client basis, said server comprising:

a processing thread that transmits a priority value to a first client in response to a first request from said first client;

an input facility that receives a second request from said first client and a third request from a second client, said second request including said priority value; and a dispatcher that causes said second request to be processed preferentially by dispatching said second request to be serviced before dispatching said third request, relative to said third request, based on said priority value of said second request.

6. A server with facilities for customizing the quality of service provided within a collaborative data processing environment on a per-client basis, said server comprising:

a processing thread that transmits a priority value to a first client in response to a first request from said first client;

an input facility that receives a second request from said first client and a third request from a second client, said second request including said priority value; and a dispatcher that causes said second request to be processed preferentially by propagating said priority value to a service agent for said second request, relative to said third request, based on said priority value of said second request.

7. A program product for customizing the quality of service provided within a collaborative data processing environment on a per-client basis, said program product comprising:

a processing thread that transmits a first priority value to a first client in response to a first request from said first client and transmits a second priority value to a second client in response to an earlier request from said second client received before a third request;

an input facility that receives said second request from said first client and a third request from a second client, said second request including said first priority value;

a dispatcher that causes said second request to be processed preferentially, relative to said third request, based on said respective first and second priority values of said second and third requests; and computer usable medium encoding said processing thread, said input facility, and said dispatcher.

8. A program product for customizing the quality of service provided within a collaborative data processing environment on a per-client basis, said program product comprising:

a processing thread that transmits a priority value to a first client in response to a first request from said first client;

an input facility that receives a second request from said first client and a third request from a second client, said second request including said priority value;

a dispatcher that causes said second request to be processed preferentially by dispatching said second request to be serviced before dispatching said third request, relative to said third request, based on said priority value of said second request; and computer usable medium encoding said processing thread, said input facility, and said dispatcher.

9. A program product for customizing the quality of service provided within a collaborative data processing environment on a per-client basis, said program product comprising:

a processing thread that transmits a priority value to a first client in response to a first request from said first client;

an input facility that receives a second request from said first client and a third request from a second client, said second request including said priority value;

a dispatcher that causes said second request to be processed preferentially by propagating said priority value to a service agent for said second request, relative to said third request, based on said priority value of said second request; and computer usable medium encoding said processing thread, said input facility, and said dispatcher.

* * * * *